(12) United States Patent
Namkung

(10) Patent No.: US 9,939,971 B2
(45) Date of Patent: Apr. 10, 2018

(54) DISPLAY APPARATUS

(71) Applicant: SAMSUNG DISPLAY CO., LTD., Yongin, Gyeonggi-Do (KR)

(72) Inventor: Jun Namkung, Asan-si (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 127 days.

(21) Appl. No.: 14/749,740

(22) Filed: Jun. 25, 2015

(65) Prior Publication Data
US 2016/0062506 A1 Mar. 3, 2016

(30) Foreign Application Priority Data
Sep. 3, 2014 (KR) .................. 10-2014-0117219

(51) Int. Cl.
*G06F 3/044* (2006.01)
*G09G 3/3233* (2016.01)
*G06F 1/16* (2006.01)

(52) U.S. Cl.
CPC ............ *G06F 3/044* (2013.01); *G06F 1/1626* (2013.01); *G06F 1/1658* (2013.01); *G09G 3/3233* (2013.01); *G06F 2203/04103* (2013.01); *G09G 2300/0426* (2013.01); *G09G 2380/02* (2013.01)

(58) Field of Classification Search
CPC ...... G06F 3/044; G06F 1/1626; G06F 1/1658; G06F 2203/04103; G09G 3/3233; G09G 2300/0426; G09G 2380/02
See application file for complete search history.

(56) References Cited

U.S. PATENT DOCUMENTS

| | | | | |
|---|---|---|---|---|
| 2011/0050657 | A1* | 3/2011 | Yamada | H01L 27/3293 345/204 |
| 2011/0242017 | A1* | 10/2011 | Kang | G06F 3/045 345/173 |
| 2013/0002133 | A1* | 1/2013 | Jin | G09F 9/33 313/511 |
| 2013/0016047 | A1* | 1/2013 | Masumoto | G02F 1/13338 345/173 |
| 2013/0321293 | A1* | 12/2013 | Park | G06F 3/041 345/173 |

(Continued)

FOREIGN PATENT DOCUMENTS

| | | |
|---|---|---|
| JP | 2010-035046 A | 2/2010 |
| JP | 2012-027622 A | 2/2012 |

(Continued)

*Primary Examiner* — Kumar Patel
*Assistant Examiner* — Amy C Onyekaba
(74) *Attorney, Agent, or Firm* — Lee & Morse, P.C.

(57) ABSTRACT

A display apparatus, including a display panel generating an image; a window member on the display panel and including a display region transmitting the image and a non-display region adjacent to the display region; and a touch panel between the display panel and the window member, the touch panel including a lower base member; an upper base member including a front portion overlapped with an upper surface of the lower base member, and a side portion bent from the front portion and covering a side of the lower base member; touch electrodes on at least one of the upper surface of the lower base member and a lower surface of the upper base member; and signal lines connected to the touch electrodes.

15 Claims, 10 Drawing Sheets

(56) References Cited

U.S. PATENT DOCUMENTS

| | | | | |
|---|---|---|---|---|
| 2015/0091012 A1* | 4/2015 | Namkung | ............... | G09G 3/34 257/72 |
| 2015/0181715 A1* | 6/2015 | Jaw | ................. | H05K 3/00 216/13 |

FOREIGN PATENT DOCUMENTS

| KR | 10-2011-0002386 A | 1/2011 |
|---|---|---|
| KR | 10-2012-0094655 A | 8/2012 |
| KR | 10-2013-0105973 A | 9/2013 |
| KR | 10-2015-0007632 A | 1/2015 |
| KR | 10-2015-0094989 A | 8/2015 |

\* cited by examiner

DISPLAY APPARATUS

CROSS-REFERENCE TO RELATED APPLICATION

Korean Patent Application No. 10-2014-0117219, filed on Sep. 3, 2014, in the Korean Intellectual Property Office, and entitled: "Display Apparatus," is incorporated by reference herein in its entirety.

BACKGROUND

1. Field

Provided is a display apparatus.

2. Description of the Related Art

Display apparatuses for multimedia may include, for example, televisions, mobile phones, tablet computers, navigators, and gaming sets. Display apparatuses may be accompanied by input devices such as, for example, keyboards and mice. Display apparatuses may employ touch panels as input devices.

SUMMARY

Embodiments may be realized by providing a display apparatus, including a display panel generating an image; a window member on the display panel and including a display region transmitting the image and a non-display region adjacent to the display region; and a touch panel between the display panel and the window member, the touch panel including a lower base member; an upper base member including a front portion overlapped with an upper surface of the lower base member, and a side portion bent from the front portion and covering a side of the lower base member; touch electrodes on at least one of the upper surface of the lower base member and a lower surface of the upper base member; and signal lines connected to the touch electrodes.

The touch electrodes may be overlapped with the display region and the signal lines may be overlapped with the non-display region.

Each of the signal lines may include a connector at one end of a corresponding signal line of the signal lines and connected to a corresponding touch electrode of the touch electrodes; a pad at the other end of the corresponding signal line of the signal lines; and a line connecting the connector with the pad.

The display apparatus may further include a flexible circuit board connected to the pad.

The non-display region may include a connection region overlapping the pad and the flexible circuit board, and a peripheral region adjacent to the connection region, and the front portion may be overlapped with the display region and the peripheral region.

The side portion may be opposite to a side of the display panel.

The display apparatus may further include a lower frame combining with the window member and accommodating the display panel.

The display apparatus may further include an adhesive member gluing a back of the display panel with the lower frame.

The upper base member may further include a back portion bent from the side portion and disposed under the back of the display panel.

The back portion may be completely overlapped with the back of the display panel.

The display apparatus may further include an adhesive member gluing the back portion with the lower frame.

The display panel may include a base member; a device layer on the base member and overlapped with the display region; and a sealing layer covering the device layer.

The display apparatus may further include a barrier portion on an upper surface of the base member, opposite to the side portion, and in the non-display region.

The base member and the barrier portion may be shaped in one body.

The display panel further may include a protection film on a lower surface of the base member.

The device layer may include a pixel and a device layer signal line connected to the pixel.

The pixel may include an organic light emitting diode.

The display panel, the window member, and the touch panel each may include a flat portion and a bending portion bent from the flat portion.

The flat and bending portions of the display panel each may generate images with information different from each other.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
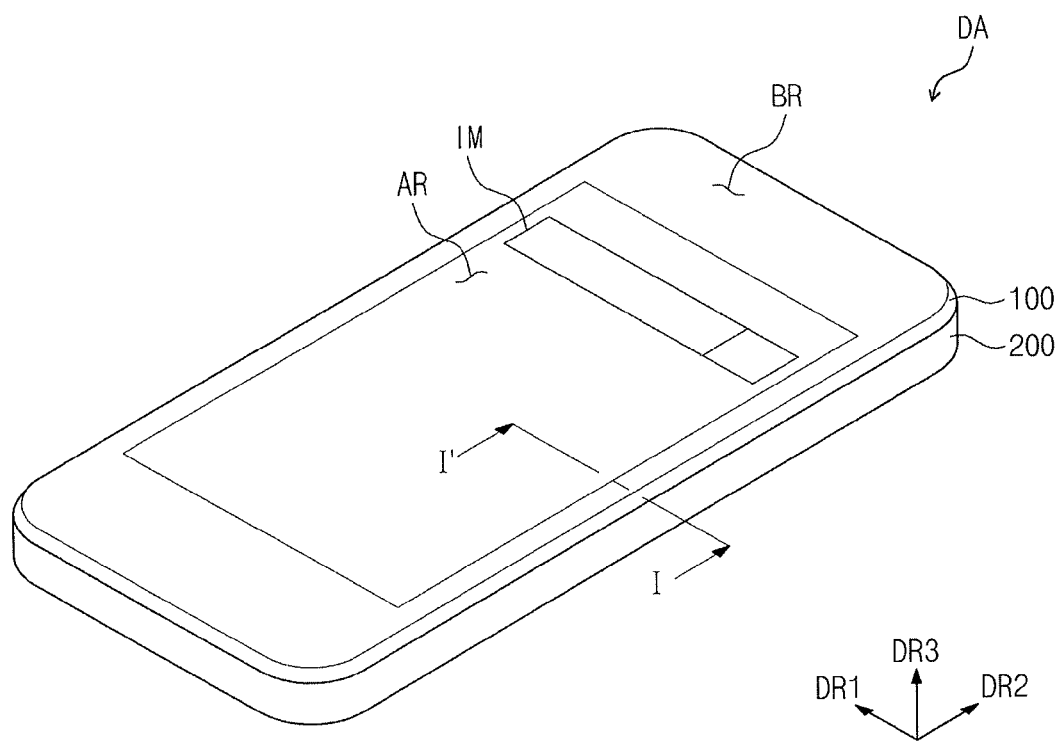
FIG. 1 illustrates a perspective view of a display apparatus according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present.

Unless otherwise defined, all terms (including technical and scientific terms) used herein have the same meaning as commonly understood by one of skill in the art. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Now hereinafter will be described exemplary embodiments in conjunction with accompanying drawings.

Figure 2:
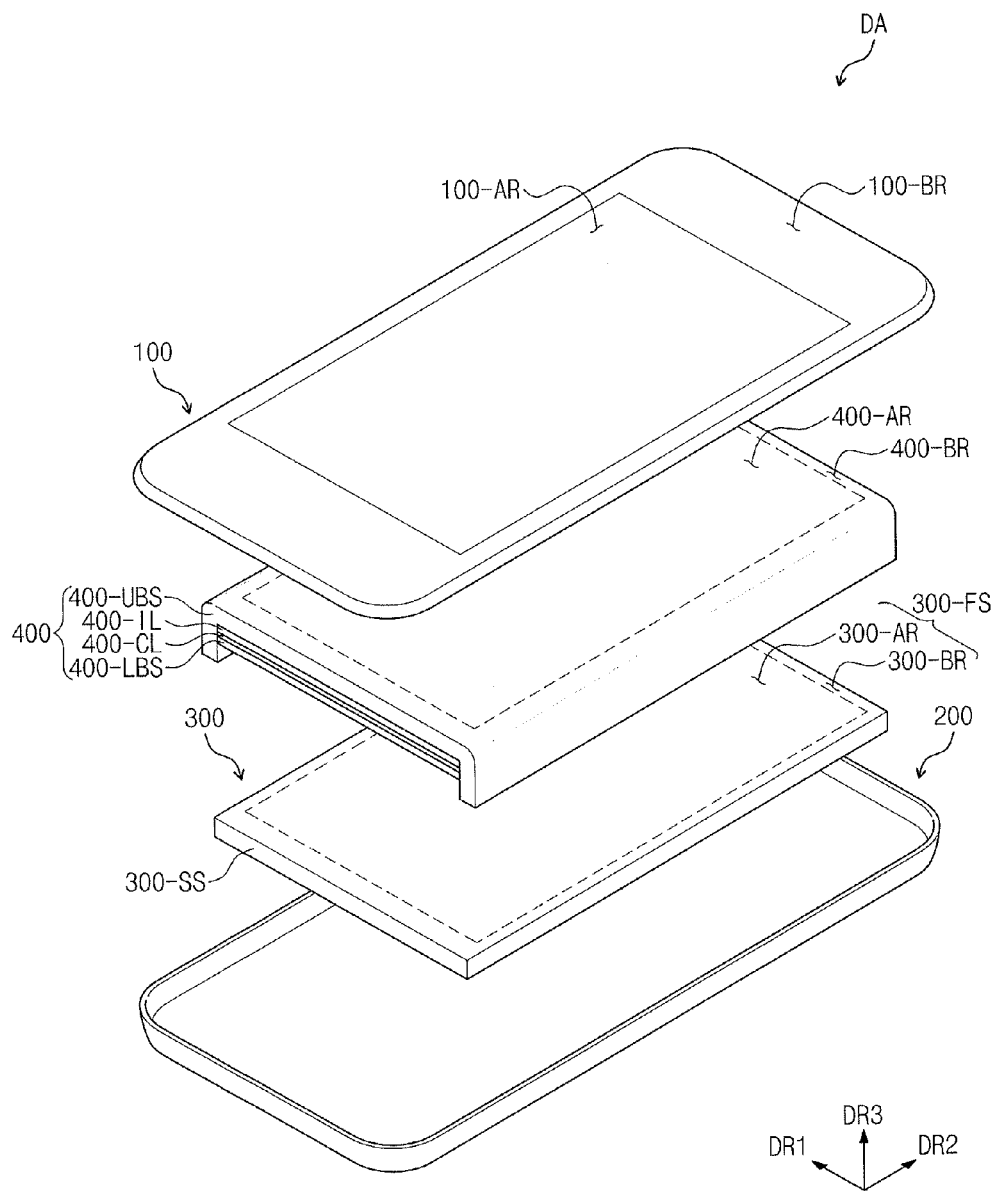
FIG. 2 illustrates an explosive perspective view of a display apparatus according to an embodiment.

FIG. 1 illustrates a perspective view of a display apparatus according to an embodiment. FIG. 2 illustrates an explosive perspective view of a display apparatus according to an embodiment.

A display plane on which an image IM may be expressed may be parallel with a plane defined by a first direction axis DR1 and a second direction axis DR2. A normal direction of the display plane is indicated by a third direction axis DR3. The third direction axis DR3 is a reference axis to differentiate respective fronts and backs of members. Directions indicated by the direction axes, as relative dimensions, may be modified to other directions.

FIG. 1 shows a mobile phone as an exemplary display apparatus according to an embodiment. In an embodiment, the display apparatus may be, for example, a small-to-medium electronic apparatus such as a personal computer, a laptop computer, a personal digital terminal, a car navigation unit, a gaming set, a portable electronic device, a watch-type electronic device, and a camera, as well as large-sized electronic equipment such as a television set or an outdoor advertisement panel.

As illustrated in FIG. 1, the display apparatus DA may include a plurality of regions to be differentiated on the display plane. The display apparatus DA may include a display region AR in which the image IM may be expressed, and a non-display region BR adjacent to the display region AR. FIG. 1 shows an internet search window as an example of the image IM. For example, the display region AR may be shaped in a square. The non-display region BR may encompass the display region AR. The non-display region BR may form an edge of the display plane.

As illustrated in FIGS. 1 and 2, the display apparatus DA may include a window member 100, a lower frame 200, a display panel 300, and a touch panel 400. The window member 100, the display panel 300 and the touch panel 400 may be differentiated into regions corresponding to the display region AR and the non-display region BR of the display apparatus DA on plane.

The window member 100 may include a display are 100-AR to transmit the image IM that may be provided by the display panel 300, and a non-display region 100-BR adjacent to the display region 100-AR. The window member 100 may be formed of, for example, glass, sapphire, or plastic.

The lower frame 200 may be coupled with, e.g., to, the window member 200 to accommodate the display panel 300 and the touch panel 400. The lower frame 200 may be assembled by a plurality of components or may include one body made by injection molding. The lower frame 200 may include plastics or metals. In an embodiment, the lower frame 200 may be excluded from the configuration.

The display panel 300 may include a front 300-FS, a side 300-SS, and a back. The front 300-FS of the display panel may include a display region 300-AR and a non-display region 300-BR. The display region 300-AR of the display panel may generate the image IM. The display panel 300 may include a protection film, a base member, a device layer, and a sealing layer, these elements of which will be detailed later.

The touch panel 400 may include a lower base member 400-LBS, a conduction layer 400-CL, an insulation layer 400-IL, and an upper base member 400-UBS. The touch panel 400 also may include a display region 400-AR and a non-display region 400-BR. The display region 400-AR may correspond to the display region 100-AR of the window member 100. The non-display region 400-BR may correspond to the non-display region 100-BR of the window member 100.

Figure 3A:
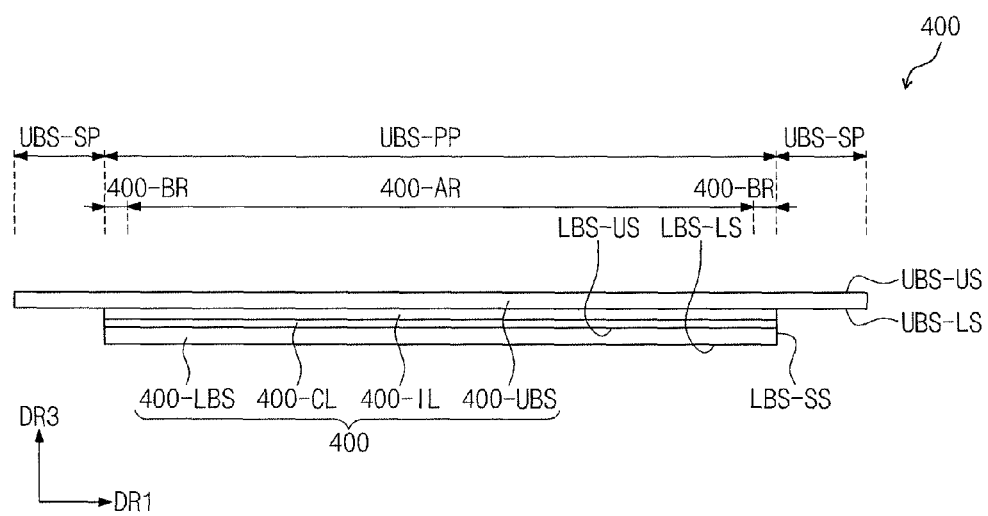
FIGS. 3A and 3B illustrate sectional views of a display apparatus according to an embodiment.
Figure 3B:
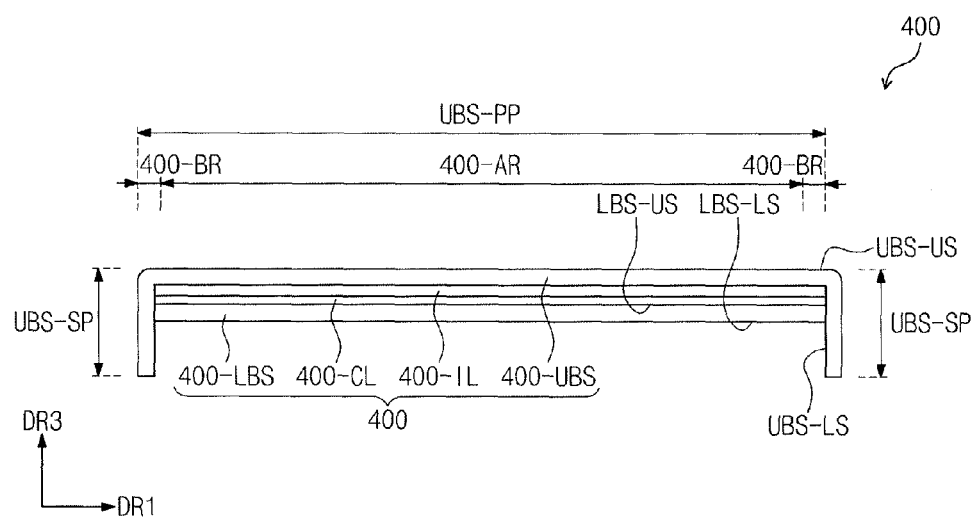
Figure 4:
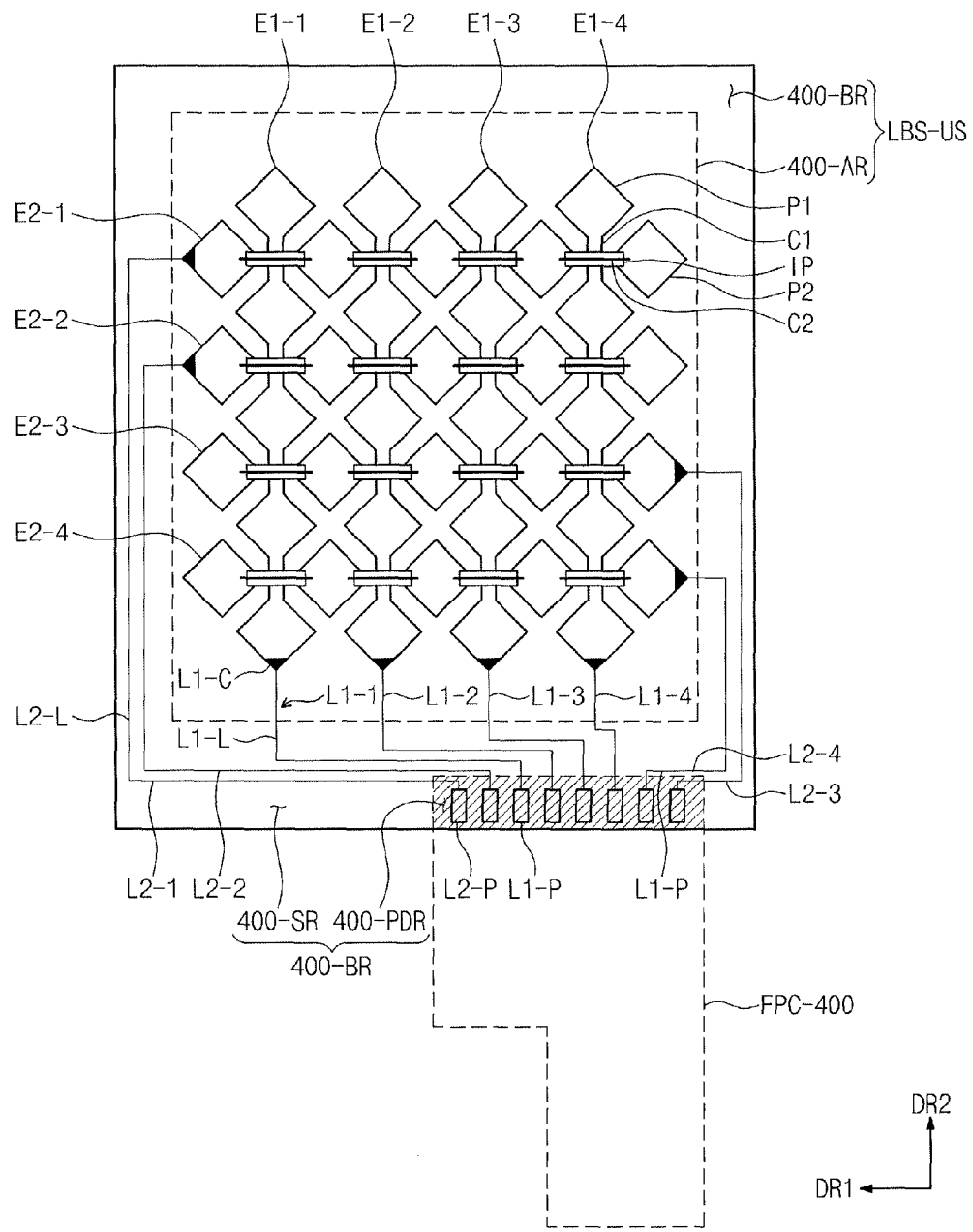
FIG. 4 illustrates a plan view of a display apparatus according to an embodiment.

FIGS. 3A and 3B illustrate sectional views of a display apparatus according to an embodiment. FIG. 4 illustrates a plan view of a display apparatus according to an embodiment.

As illustrated in FIGS. 3A and 3B, the lower base member 400-LBS may include an upper surface LBS-US, a lower surface LBS-LS, and a side LBS-SS. The conduction layer 400-CL may be disposed on the upper surface LBS_US of the lower base member 400-LBS. As described hereinafter, the conduction layer 400-CL may include touch electrodes, and signal lines connected to the touch electrodes. The insulation layer 400-IL may be disposed on the conduction layer 400-CL. The insulation layer 400-IL may protect the conduction layer 400-CL from, for example, external pressure and humidity.

The upper base member 400-UBS may be disposed on the insulation layer 400-IL. The upper base member 400-UBS may include a front portion UBS-PP, and a side portion UBS-SP bent from the front portion UBS-PP. As shown in FIGS. 3A and 3B, the upper base member 400-UBS may include two side portions opposing each other along the first direction axis DR1 while interposing the front portion UBS-PP, e.g., with the front portion UBS-PP interposed therebetween. The side portion UBS-SP may be bent from the front portion UBS-PP, and may cover the side LBS-SS of the lower base member. The side portion UBS-SP may prevent humidity from infiltrating into the conduction layer 400-CL. In an embodiment, the upper base member 400-UBS may further include a side portion bent from another edge of the front portion UBS-PP.

In an embodiment, a conduction layer may be further disposed between the insulation layer 400-IL and the upper base member 400-UBS. In an embodiment, the conduction layer may be disposed between the insulation layer 400-IL and the upper base member 400-UBS. The conduction layer may be disposed at the lower surface UBS-LS of the upper base member 400-UBS.

FIG. 4 shows the conduction layers of FIGS. 3A and 3B in detail. FIG. 4 also illustrates an exemplary single-layered capacitive touch panel. Coordinate information about touched points may be obtained in the manner of self capacitance or mutual capacitance.

In the conduction layer 400-CL placed on the upper surface LBS-US of the lower base member, touch electrodes and signal lines may be disposed. The touch electrodes may include first touch electrodes E1-1~E1-4 (hereinafter abbreviated to E1) and second touch electrodes E2-1~E2-4 (hereinafter abbreviated to E2). The touch electrodes may be disposed to be overlapped with, e.g., to overlap, the display region 400-AR. The signal lines may include first signal lines L1-1~L1-4 (hereinafter abbreviated to L1-$n$) and second signal lines L2-1~L2-4 (hereinafter abbreviated to L2-$m$). The signal lines may be disposed to be overlapped with the non-display region 400-BR.

The first touch electrodes 400-BR may extend along the second direction axis DR2, and may be arranged in the first direction axis DR1. The second touch electrodes may extend along the first direction axis DR1, and may be arranged in the second direction axis DR2. The first touch electrodes E1 may be insulated from and intersect the second touch electrodes E2.

The first touch electrodes E1 may include a plurality of sensors P1 (hereinafter referred to 'first sensors') and a plurality of connectors C1 (hereinafter referred to 'first connectors'), respectively. The first connectors C1 may couple adjacent two of the first sensors P1 to each other. The second touch electrodes E2 may include a plurality of sensors P2 (hereinafter referred to 'second sensors') and a plurality of connectors C2 (hereinafter referred to 'second connectors'), respectively. The second connectors C2 may couple adjacent two of the second sensors P2 to each other. The second connectors C2 may be bridge electrodes disposed on insulation patterns IP placed on the first connectors C1.

The first touch electrodes E1 may each be connected to the first signal lines L-n. As like one of, e.g., similar to, the first signal line L1-1 shown in FIG. 4, each of the first signal lines L1-$n$ may include a first connector L1-C, a first line L1-L, and a first pad L1-P. The first signal lines L1-$n$ may each be connected to correspondents of the, e.g., corresponding, first touch electrodes E1 through the first connectors L1-C. The first lines L1-$n$ may couple the first connectors L1-C with the first pads L1-P.

The second touch electrodes E2 may be connected to the second signal lines L2-L, respectively. The second signal lines L2-L may include second connectors L2-C, second lines L2-L, and second pads L2-P. The second signal lines L2-L may each be connected to correspondents of the second touch electrodes E2 at the second connectors L2-C. The second lines L2-L may couple the second connectors L2-C with the second pads L2-P.

The non-display region 400-BR may include a pad region 400-PDR in which, e.g., including, the first and second pads L1-P and L2-P, and a peripheral region 400-SR adjacent to the pad region 400-PDR. To the pad region 400-PDR may be connected to a first flexible circuit board FPC-400. By way of the first flexible circuit board FPC-400, the touch panel 400 may be connected to a main drive circuit.

The first and second signal lines, L1-$n$ and L2-$m$, may be disposed in the peripheral region 400-SR. The front portion UBS-PP of the upper base member 400-UBS may be overlapped with the display region 400-AR and the peripheral 400-SR. The upper base member 400-UBS may be overlapped with the pad region 400-PDR, or may not be overlapped with the pad region 400-PDR not to overlap with the first flexible circuit board FPC-400.

In an embodiment, the touch panel 400 may be modified to be operable in the mode of electromagnetic induction or resistive film, and the conduction layer 400-CL may be changed in configuration.

Figure 5:
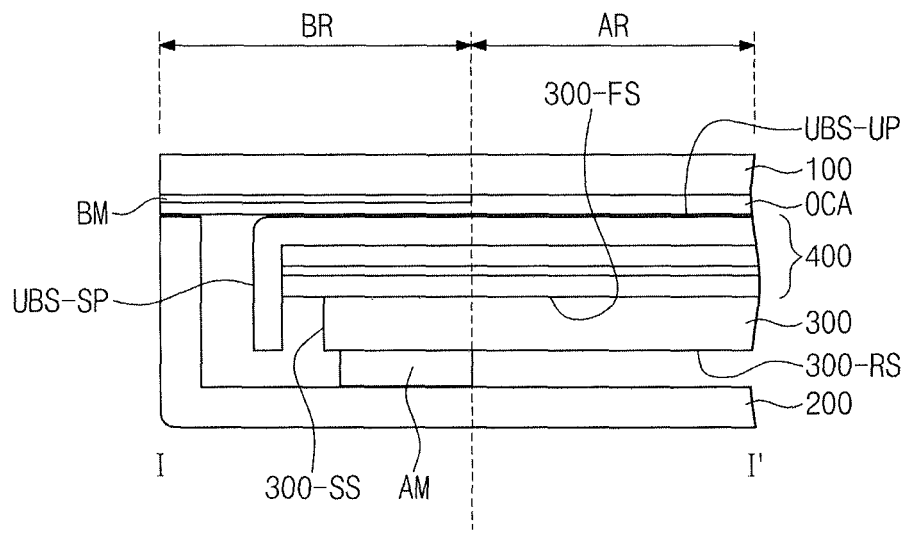
FIG. 5 illustrates a sectional view of a display apparatus according to an embodiment.

FIG. 5 illustrates a sectional view of a display apparatus according to an embodiment. Now FIGS. 2 and 5 will be referred to describe an interconnection feature between the window member 100, the lower frame 200, the display panel 300 and the touch panel 400.

As illustrated in FIG. 5, the display panel 300 may include a front 300-FS, a side 300-SS, and a back 300-RS. On the front 300-FS may be disposed the touch panel 400 and the window member 100. On the back of the window member 100 may be disposed a black mattress BM to define the non-display region BR. The black mattress BM may be formed with a colored organic layer in the manner of coating.

Between the touch panel 400 and the window member 100 may be interposed an optically clear adhesive film OCA.

The optically clear adhesive film OCA may stick the touch panel 400 to the window member 100.

The touch panel 400 may be overlapped with on the front 300-FS of the display panel 300. The side portion UBS-SP of the upper base member of the touch panel 400 may be opposed to the side 300-SS of the display panel. The side portion UBS-SP of the upper base member may protect the side 300-SS of the display panel from an externally physical impact. The side portion UBS-SP of the upper base member may be able to restrain humidity from infiltrating into the side 300-SS of the display panel.

The lower frame 200 may be coupled up with the window member 100. The lower frame 200 may be configured to cover the back 300-RS of the display panel. An adhesive member AM may be interposed between the back 300-RS and the lower frame 200. The adhesive member AM may glue the lower frame 200 and the back 300-RS of the display panel together.

Figure 6:
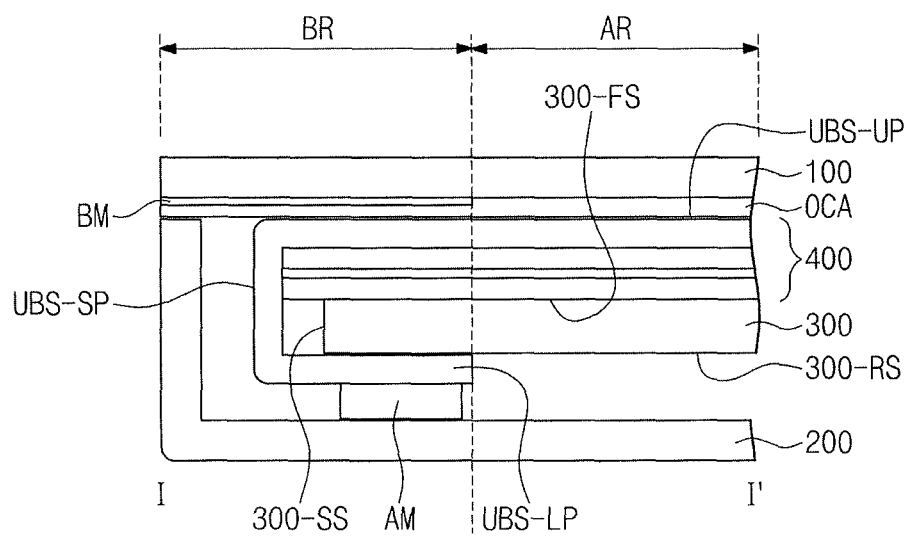
FIG. 6 illustrates a sectional view of a display apparatus, taken along I-I' of FIG. 1, according to an embodiment.
Figure 7:
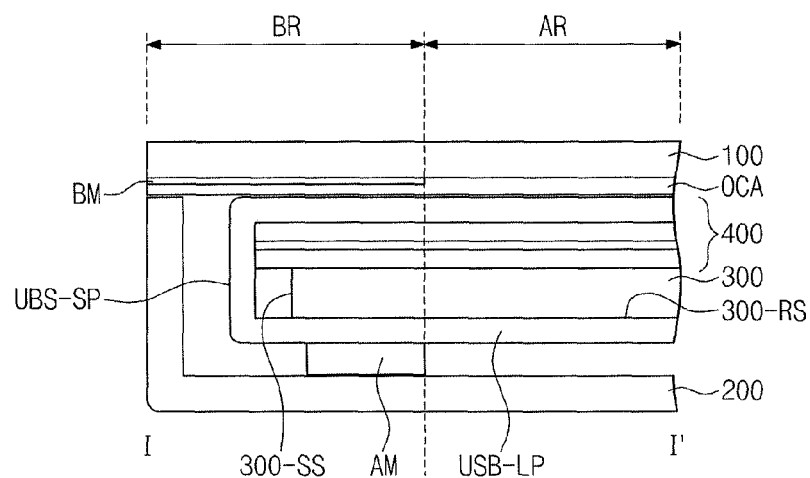
FIG. 7 illustrates a sectional view of a display apparatus, taken along I-I' of FIG. 1, according to an embodiment.

FIGS. 6 and 7 illustrate sectional views of a display apparatus, taken along I-I' of FIG. 1, according to an embodiment. Hereinafter will be described the display apparatus according to this embodiment, but the configurations same with those aforementioned with reference to FIGS. 1 to 5 will not be further detailed.

As illustrated in FIG. 6, the upper base member 400-UBS of the touch panel 400 may further include a back portion UBS-LP which may be bent from the side portion UBS-SP and disposed under the back 300-RS of the display panel 300. The back portion UBS-LP of the upper base member 400-UBS may be overlapped with the non-display region BR. The display apparatus DA may further include an adhesive member AM to glue the back portion UBS-LP of the upper base member 400-UBS and the lower frame 200 together.

As illustrated in FIG. 7, the upper base member 400-UBS of the touch panel 400 may further include a back portion UBS-LP which may be bent from the side portion UBS-SP and disposed under the back 300-RS of the display panel 300. The back portion UBS-LP of the upper base member 400-UBS may be overlapped with the lower side of the back 300-RS corresponding to the display region AR and the non-display region BR. The back portion UBS-LP may combine with the touch panel 400 to the display panel 30. Between the back portion UBS-LP and the back 300-RS of the display panel 300 may be disposed an adhesive layer. The back portion UBS-LP may be wholly, e.g., completely, overlapped with the back 300-RS of the display panel 300, and durability of the display panel 300 may be improved.

Figure 8:
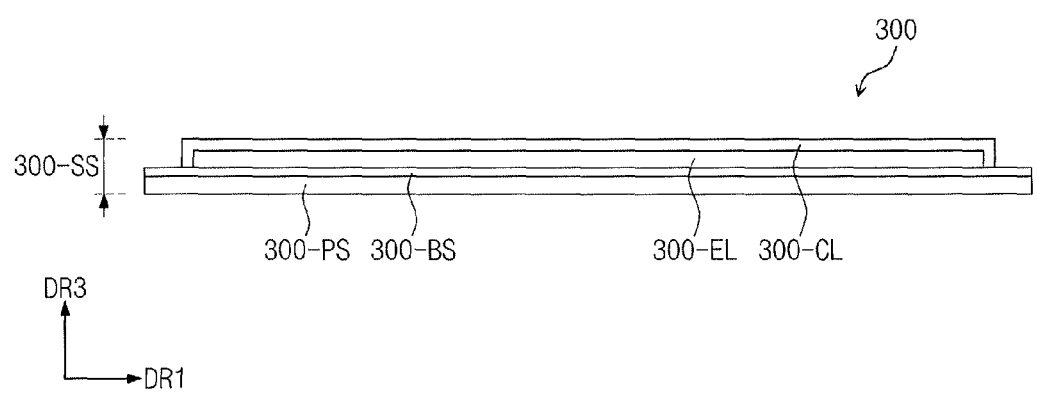
FIG. 8 illustrates a sectional view of a display panel according to an embodiment.
Figure 9:
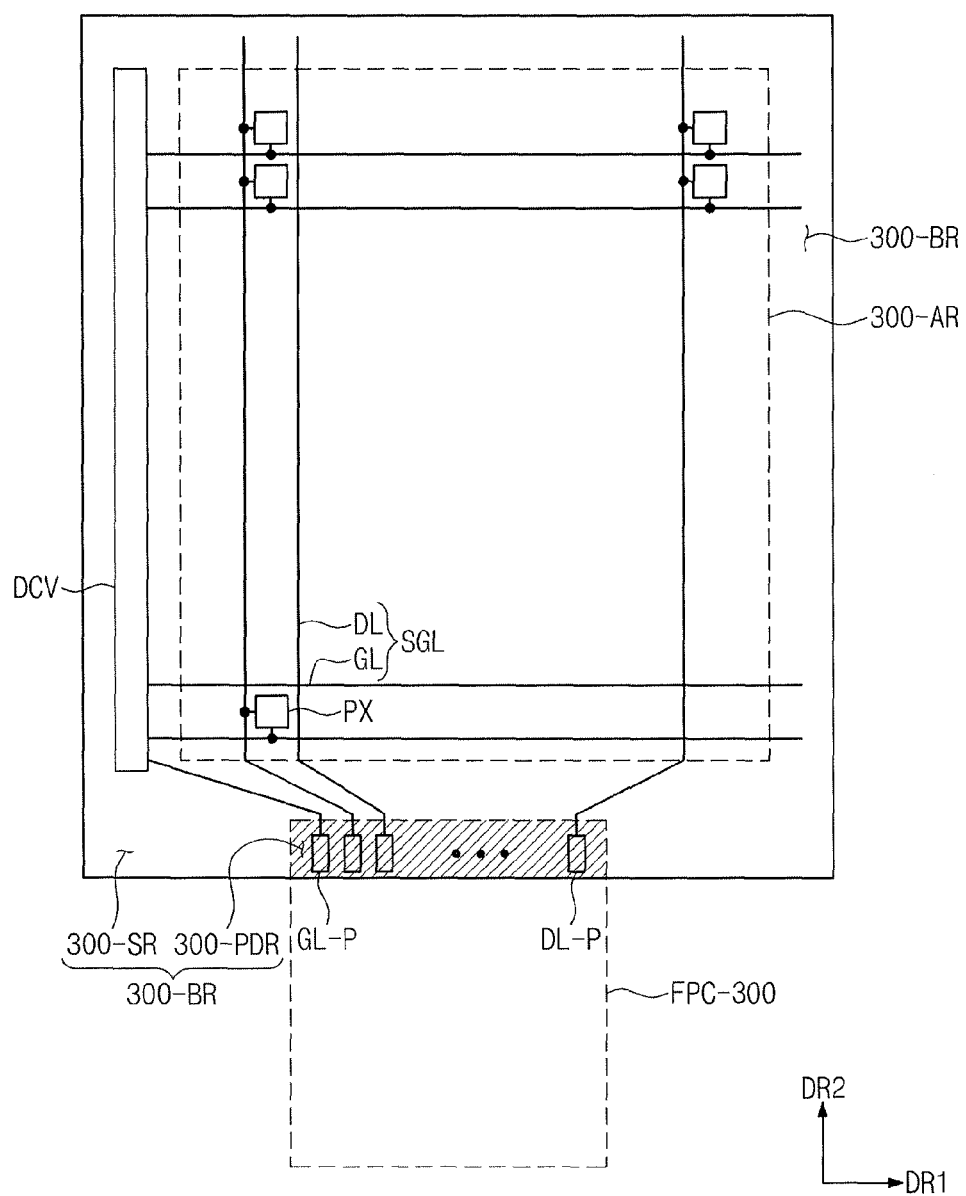
FIG. 9 illustrates a sectional view of a display panel according to an embodiment.

FIG. 8 illustrates a sectional view of a display panel according to an embodiment. FIG. 9 illustrates a sectional view of a display panel according to an embodiment. Hereinafter will be described the display panel with reference to FIGS. 8 and 9.

As illustrated in FIG. 8, the display panel 300 may include a protection film 300-PS, a base member 300-BS, a device layer 300-EL, and a sealing layer 300-CL. The device layer 300-EL may be disposed on the base member 300-BS. The sealing layer 300-CL may cover the device layer 300-EL. The display panel 300 may further include a polarization plate which may be disposed on the sealing layer 300-CL.

The protection film 300-PS may be disposed under the lower side of the base member 300-BS. The protection film 300-PS may be omitted from the configuration of the display apparatus. The base member 300-BS may contain one or more of of polyimide (PI), polyethyleneterephthalate (PET), polyethylenenaphthalate (PEN), polyethersulphone (PES), or fiber reinforced plastics (FRP).

As illustrated in FIG. 9, the device layer 300-EL (of FIG. 8) of the display panel 300 may include a plurality of pixels PX and a plurality of signal lines (SGL), e.g., a plurality of device layer signal lines (SGL). The plural pixels PX may be overlapped with the display region 300-AR. The plural signal lines SGL may include gate lines GL arranged in the second direction axis SR2, and data lines DL arranged in the first direction axis DR1. The gate lines GL and the data lines DL may respectively be connected to their correspondents of the plural pixels PX. The plural pixels PX may include organic light emitting diodes (OLEDs) and circuits for controlling intensity of current that is applied to the OLEDs. Each circuit may include at least one thin film transistor and at least one capacitor. The pixel may be variously configured in accordance with a type of the display panel, e.g. liquid crystal display panel, OLED panel, or electrophoretic display panel.

At one side of the non-display region 300-BR, a drive circuit DVC may be disposed to be connected with the gate lines GL. The drive circuit DVC may supply gate signals to the gate lines GL. The drive circuit DVC may receive a clock signal and a control signal from a gate pad portion GL-P which may be disposed in the non-display region 300-BR. The data lines DL may be electrically connected to data pad portions DL-P which may be disposed in the non-display region 300-BR. The data pad portions DL-P may be connected to a data drive circuit of COF type.

The non-display region 300-BR may include a pad region 300-PDR in which the gate pad portion GL-P and the data pad portion DL-P may be disposed, and a peripheral region adjacent to the pad region 300-PDR. The pad region 300-PDR may be connected with a second flexible circuit board FPC-300. The display panel 300 may be connected to the main drive circuit through the second flexible circuit board FPC-300. The second flexible circuit board FPC-300 may be bent along a virtual axis (not shown) that may be parallel to the first direction axis DR1, and the main drive circuit may be disposed on the back of the display panel 300 and the back of the lower frame 200 (see FIGS. 1 and 2).

Figure 10A:
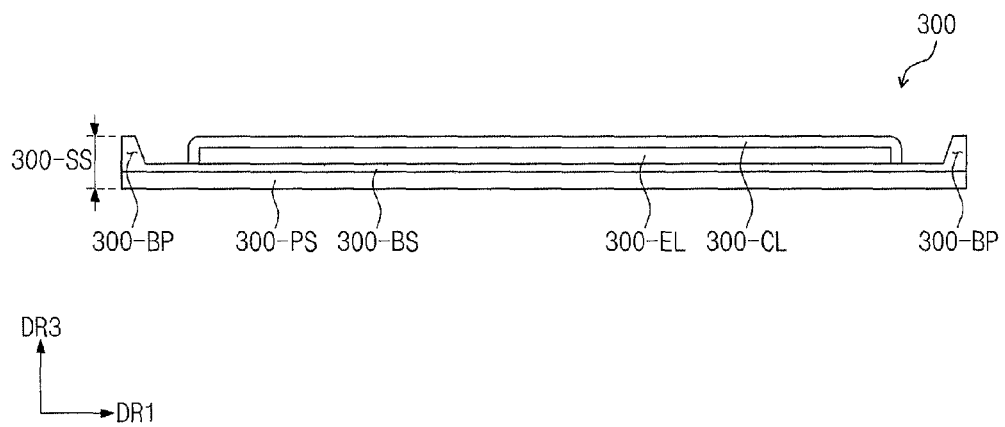
FIG. 10A illustrates a sectional view of a display panel according to an embodiment.
Figure 10B:
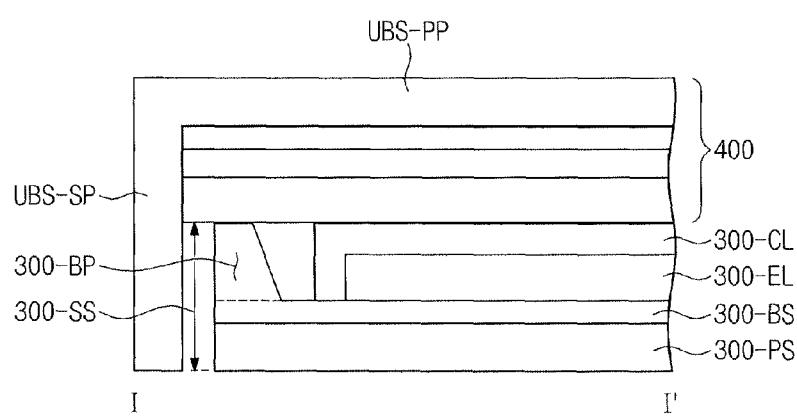
FIG. 10B illustrates a sectional view of a display apparatus according to an embodiment.

FIG. 10A illustrates a sectional view of a display panel according to an embodiment. FIG. 10B illustrates a sectional view of a display apparatus according to an embodiment. Hereinafter will be described the display panel and the display apparatus, according to embodiments, in conjunction with FIGS. 10A and 10B. The same configuration as shown in FIGS. 1 to 9 will not be further detailed.

As illustrated in FIG. 10A, the display panel 300 further may include a barrier portion 300-BP which may be disposed on the upper surface of the base member 300-BS. The barrier portion 300-BP may be disposed in correspondence with the non-display region 300-BR. The barrier portion 300-BP may be shaped in one body with the base member 300-BS. The barrier portion 300-BP may be shaped to extend along the second direction axis DR2 (see FIG. 9).

As illustrated in FIG. 10, the barrier portion 300-BP may be opposed to the side portion UBS-SP which may be bent from the front portion UBS-PP of the upper base member 400-UBS. The barrier portion 300-BP may prevent humidity from infiltrating into the interface between the base member 300-BS and the device layer 300-EL from the side 300-SS of the display panel, together with the side portion UBS-SP. The barrier portion 300-BP may help protect the device layer 300-EL from an external physical impact.

Figure 11:
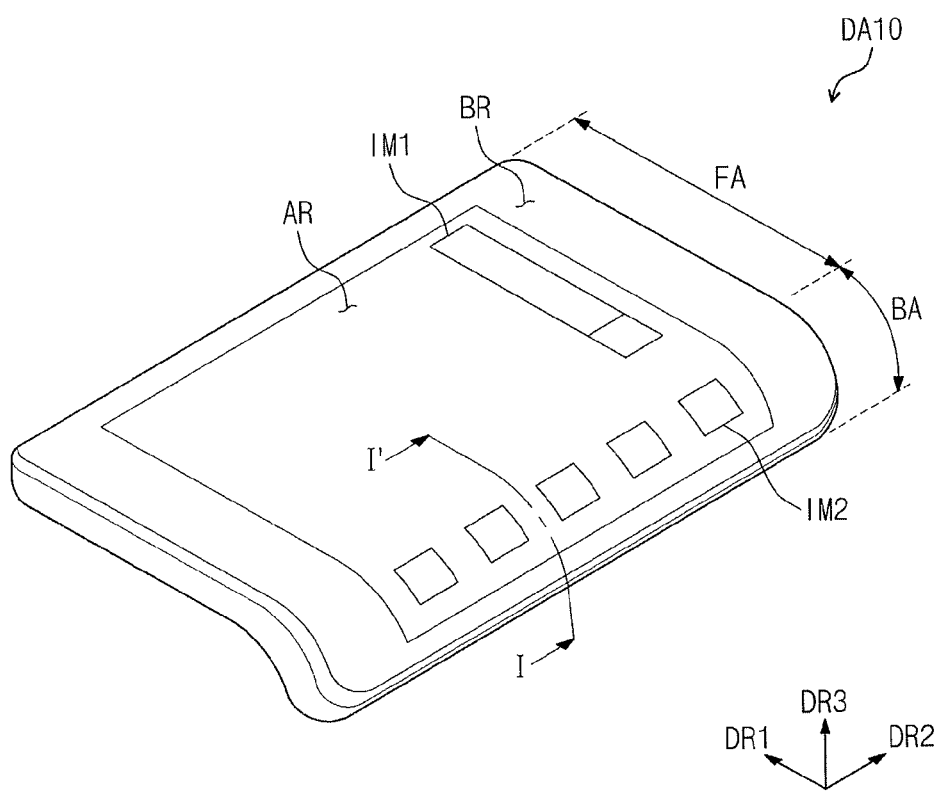
FIG. 11 illustrates a perspective view of a display apparatus according to an embodiment.
Figure 12:
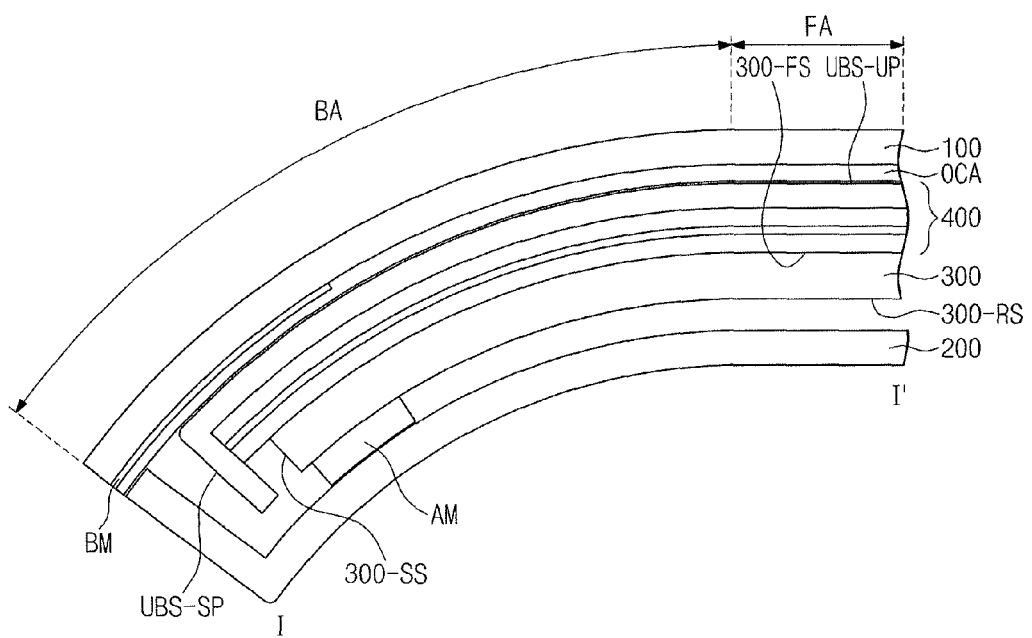
FIG. 12 illustrates a sectional view of a display apparatus, taken along I-I' of FIG. 11, according to an embodiment.

FIG. 11 illustrates a perspective view of a display apparatus according to an embodiment. FIG. 12 illustrates a sectional view of a display apparatus, taken along I-I' of FIG. 11, according to an embodiment. Now will be described the display apparatus according to an embodiment in conjunction with FIGS. 11 and 12. The same configuration as aforementioned with FIGS. 1 to 10B will not be further detailed.

As illustrated in FIG. 11, the display apparatus DA10 may be partly bent in shape. The display apparatus DA10 may include a flat portion FA, and a bending portion BA which may be bent from the flat portion FA. A part of the display region AR may be placed in the flat portion FA, and the other part of the display region AR may be placed in the bending portion BA. The flat portion FA may express a first image IM1, which may have first information, along the third direction axis DR3, and the bending portion BA may express a second image IM2, which may have second information, along a direction intersecting the third direction axis DR3. In an embodiment, for example, FIG. 11 shows an internet search window as an example for the first information, and an icon as an example for the second information. The display apparatus according to an embodiment may include two of the bending portions which are opposite to each other in the first direction axis DR1.

As illustrated in FIG. 12, the display apparatus DA10 may include a window member 100, a lower frame 200, a display panel 300, and a touch panel 400. The window member 100, the lower frame 200, the display panel 300 and the touch panel 400 may be partly bent in shape. The window member 100, the lower frame 200, the display panel and the touch panel 400 may respectively include flat and bending portions which may be differentiated along the first direction axis DR1.

Although FIG. 12 illustrates an exemplary display apparatus structured as same as the staked structure shown in FIG. 5, the display apparatus DA10 may even configured in the stacked structure shown in FIG. 6 or 7. The upper base member 400-UBS of the touch panel 400 may further include the back portion UBS-LP. As illustrated in FIG. 10A, the display panel 300 may further include the barrier portion 300-BP.

As described above, the side portion of the upper base member may cover the side of the lower base member, may prevent humidity from infiltrating into the signal lines of the touch panel, and may protect the signal lines from corrosion due to humidity.

The side portion of the upper base member may be opposite to the side of the display panel. The side portion of the upper base member may help protect the side of the display panel from a physical impact. The side portion of the upper base member may help restrain humidity from infiltrating into the side of the display panel.

The back portion of the upper base member may glue the touch panel with, e.g., to, the display panel. Overlaying the back portion of the upper base member on the display panel may help improve durability of the display panel.

By way of summation and review, display apparatuses may be exposed to external humidity, which may permeate into the display apparatuses. The humidity infiltrating into display apparatuses may corrode signal lines of the touch panels.

Provided is a display apparatus that may have a reduced defect rate. Embodiments are directed a display apparatus that may exhibit reduced corrosion of signal lines and improved durability. In an embodiment, a display apparatus may include a display panel; a window member disposed on the display panel; and a touch panel disposed between the display panel and the window member.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display apparatus, comprising:
   a display panel generating an image;
   a window member on the display panel and including a display region transmitting the image and a non-display region adjacent to the display region;
   a lower frame combining with the window member and accommodating the display panel;
   an adhesive member on the lower frame; and
   a touch panel between the display panel and the window member,
   the touch panel including:
      a lower base member;
      an upper base member including a front portion overlapped with an upper surface of the lower base member and disposed on the display panel, a side portion bent from the front portion and covering a side of the lower base member and a side of the display panel, and a back portion bent from the side portion and disposed under a back of the display panel;
      touch electrodes on at least one of the upper surface of the lower base member and a lower surface of the upper base member; and
      signal lines connected to the touch electrodes, wherein the adhesive member is between the back portion of the upper base member and the lower frame.

2. The display apparatus as claimed in claim 1, wherein the touch electrodes are overlapped with the display region and the signal lines are overlapped with the non-display region.

3. The display apparatus as claimed in claim 2, wherein each of the signal lines includes:
   a connector at one end of a corresponding signal line of the signal lines and connected to a corresponding touch electrode of the touch electrodes;
   a pad at the other end of the corresponding signal line of the signal lines; and
   a line connecting the connector with the pad.

4. The display apparatus as claimed in claim 3, further comprising a flexible circuit board connected to the pad.

5. The display apparatus as claimed in claim 4, wherein:
   the non-display region includes a connection region overlapping the pad and the flexible circuit board, and a peripheral region adjacent to the connection region, and
   the front portion is overlapped with the display region and the peripheral region.

6. The display apparatus as claimed in claim 1, wherein the side portion is opposite to a side of the display panel.

7. The display apparatus as claimed in claim 6, wherein the back portion is completely overlapped with the back of the display panel.

8. The display apparatus as claimed in claim 6, wherein the display panel includes:
   a base member;

a device layer on the base member and overlapped with the display region; and a sealing layer covering the device layer.

9. The display apparatus as claimed in claim 8, further comprising a barrier portion on an upper surface of the base member, opposite to the side portion, and in the non-display region.

10. The display apparatus as claimed in claim 9, wherein the base member and the barrier portion are shaped in one body.

11. The display apparatus as claimed in claim 8, wherein the display panel further includes a protection film on a lower surface of the base member.

12. The display apparatus as claimed in claim 8, wherein the device layer includes a pixel and a device layer signal line connected to the pixel.

13. The display apparatus as claimed in claim 12, wherein the pixel includes an organic light emitting diode.

14. The display apparatus as claimed in claim 1, wherein the display panel, the window member, and the touch panel each include a flat portion and a bending portion bent from the flat portion.

15. The display apparatus as claimed in claim 14, wherein the flat and bending portions of the display panel each generate images with information different from each other.

\* \* \* \* \*